US010913584B2

(12) United States Patent
Stenglein et al.

(10) Patent No.: US 10,913,584 B2
(45) Date of Patent: Feb. 9, 2021

(54) COMBINED MEASURING CUP FOR MIXING CONTAINERS

(71) Applicant: De'Longhi Braun Household GmbH, Neu-Isenburg (DE)

(72) Inventors: Christian Stenglein, Frankfurt am Main (DE); Sven Wuttig, Griesheim (DE)

(73) Assignee: DE'LONGHI BRAUN HOUSEHOLD GMBH, Neu-Isenburg (DE)

( * ) Notice: Subject to any disclaimer, the term of this patent is extended or adjusted under 35 U.S.C. 154(b) by 283 days.

(21) Appl. No.: 14/934,884

(22) Filed: Nov. 6, 2015

(65) Prior Publication Data
US 2016/0130052 A1 May 12, 2016

(30) Foreign Application Priority Data

Nov. 7, 2014 (DE) .......................... 2020 1 4105352

(51) Int. Cl.
*B65D 51/24* (2006.01)
*A47J 43/07* (2006.01)
*B65D 47/06* (2006.01)
*G01F 19/00* (2006.01)
*A47J 36/06* (2006.01)

(52) U.S. Cl.
CPC ............ *B65D 51/245* (2013.01); *A47J 43/07* (2013.01); *A47J 43/0727* (2013.01); *B65D 47/06* (2013.01); *G01F 19/00* (2013.01); *A47J 36/06* (2013.01)

(58) Field of Classification Search
CPC ...... G01F 19/00; G01F 19/007; G01F 19/002; B65D 47/06; B65D 47/00; B65D 51/245; B65D 51/2807; B65D 51/28; B65D 39/00; B65D 39/0029; B65D 39/0023; B65D 47/121; B65D 83/049; B65D 83/30; B65D 2517/0049; A47J 43/07; A47J 36/06; A47J 43/0727
USPC ..... 220/521, 212, 23.86, 711, 713–714, 703, 220/503–504; 215/228
See application file for complete search history.

(56) References Cited

U.S. PATENT DOCUMENTS

| 6,029,859 A * | 2/2000 | Robbins, III ............ B65D 1/14 141/326 |
| 8,727,163 B2 * | 5/2014 | Chrisman .............. B65D 47/04 215/260 |
| 2004/0060934 A1 * | 4/2004 | Haynes .............. B65D 51/2807 220/212 |

(Continued)

FOREIGN PATENT DOCUMENTS

| DE | 07919566 U1 | 12/1980 |
| DE | 102010017387 A1 | 12/2011 |
| EP | 2060216 A1 | 5/2009 |

OTHER PUBLICATIONS

Preliminary Search Report for French Patent Application No. 15 60644 dated Dec. 2, 2016 (7 pages).

*Primary Examiner* — Robert Poon
(74) *Attorney, Agent, or Firm* — Goodwin Procter LLP

(57) ABSTRACT

A closure element for a mixing container of a blender, which comprises a pouring area for ingredients, the pouring area having an outlet opening into the underlying container of the blender, and comprises a measuring area which is disposed next to or under the pouring area and is separated from the pouring area.

4 Claims, 4 Drawing Sheets

(56) References Cited

U.S. PATENT DOCUMENTS

| | | | |
|---|---|---|---|
| 2006/0198241 A1* | 9/2006 | Krishnachaitanya | ........................ A47J 43/046 366/205 |
| 2009/0129200 A1 | 5/2009 | Breviere et al. | |
| 2010/0232256 A1* | 9/2010 | Pryor, Jr. | ................. A47J 36/06 366/347 |
| 2011/0278314 A1* | 11/2011 | Bendix | ................... B65D 47/06 220/703 |
| 2012/0324997 A1* | 12/2012 | Tharp | ..................... G01F 19/00 73/427 |
| 2013/0150783 A1* | 6/2013 | Pamboukis | ............ A61J 7/0046 604/78 |
| 2014/0134304 A1 | 5/2014 | Picozza et al. | |
| 2014/0299697 A1 | 10/2014 | Zakowski | |

* cited by examiner

COMBINED MEASURING CUP FOR MIXING CONTAINERS

CROSS-REFERENCE TO RELATED APPLICATIONS

This application claims the benefit of and priority to German Utility Model Application No. 202014105352, filed Nov. 7, 2014, the entire contents of which are incorporated by reference herein.

FIELD OF INVENTION

The present invention relates to a combined measuring, dosing and closure element for mixing containers according to the preamble of claim 1. Such a closure element is placed, for example, in a lid of a blender, a food processor or another kitchen appliance and closes the filling opening thereof.

BACKGROUND

With a blender or a food processor, it is necessary for most processes to add small amounts of liquid exactly according to the recipe prior to the actual start of the device, for example in the case of cocktails, smoothies, etc. On the other hand, ingredients must also be frequently added during the preparation, e.g. when making mayonnaise. This problem can, of course, also occur with other kitchen appliances. In this regard, measuring cups are known from the prior art, which are placed in a filling opening in the lid of a blender and which are removed for adding ingredients, see e.g. the Braun MX2050 device. These cups are mostly approximately cylindrical in shape, with the edge of the cup often being widened in a flange-like manner, thus closing the lid when inserted. However, when the device is in use and ingredients must be added, the mixed material that is moved in the blender container may spill out when the cup is removed for adding the ingredients (such as liquids or solid ingredients). This is particularly problematic if the filling process should not occur fast, but the ingredient should be added slowly or particularly steadily.

SUMMARY OF THE INVENTION

The subject matter of the present invention makes it possible to overcome the problems of the prior art and to add liquids or other ingredients to the mixed material with the required speed or uniformity both when the kitchen appliance, e.g. a blender, is switched off and when it is in use, without having to open the lid or closure of the blender container. For this purpose, the invention provides a closure element according to claim 1 and a kitchen appliance according to original claim 5. Preferred embodiments are defined in the subclaims.

According to the present invention, a closure element is provided for a mixing container of a kitchen appliance comprising: a pouring area for ingredients, the pouring area having an outlet opening into the underlying container of the kitchen appliance, and a measuring area which is disposed next to or under the pouring area and is separated from the pouring area. Thus, the closure element can close not only the mixing container but also serves as a combined measuring, dosing and closure element, i.e. the closure element can be used as a measuring cup when removed while it serves as a dosing aid and, of course, as a closure of the mixing container when closed. In particular, the pouring area in the closure element ensures that liquids or other ingredients such as, e.g., free-flowing ingredients (sugar, spices, etc.) can be refilled or added without having to remove the closure element and splattering the kitchen. It is understood that the pouring area is not used strictly for "pouring" liquids but is also suited for adding free-flowing substances such as sugar, flour, etc. The present invention understands the "mixing container" to be any container of a kitchen appliance in which the ingredients are processed, in particular mixed, either simultaneously or successively. Mixing can also occur due to the addition alone, without a mechanical action of the device. This means that also such containers are comprised into which the ingredients are only added in order to be mechanically mixed in subsequent device parts.

Moreover, the integration of the functions of the dosing element, that is the filling element, closure element and measuring element, always ensures that in particular the element with the measuring function is always stowed on the kitchen appliance such that it cannot be lost, as is often the case in the prior art. By the outlet opening, an inlet cross-section is additionally defined which ensures that the ingredients are added steadily at all times.

The closure element can close the mixing container directly or it can be inserted into an opening of a lid which in turn closes the mixing container and is only opened, for example, for the initial addition (in the switched-off state) or for cleaning purposes.

In an advantageous embodiment, the pouring area comprises an upper part extending over substantially the entire lateral extent of the closure element, and it comprises a lower part tapering away from the upper part and comprising the outlet opening into the container of the kitchen appliance. Thus, the entire lateral extent of the closure element serves as a funnel, which particularly facilitates addition.

Preferably, the bottom wall of the upper part of the pouring area is at the same time the bottom wall of the measuring area, and the measuring area, when the closure element is inserted into the mixing container, is downwardly open such that when the closure element is removed and turned upside down, said measuring area can be filled and used for measuring the content thereof. Thus, for example, viscous ingredients such as egg, yoghurt, curd or dough preparations can run slowly from the measuring area into the mixing container, without a measuring cup having to be held for a longer period since the measuring area of the closure element is easily filled, and then the mixing container is closed by the closure element.

According to a preferred embodiment, the lower part of the pouring area has a substantially cup- or cylinder-shaped side wall touching the side wall of the measuring area such that the lateral outer contour of the closure element is vertically constricted there, thus forming a gripping area for the closure element. When removed from the mixing container, the closure element can thus be gripped particularly well, which in particular allows a larger dimensioning of the measuring area than in the conventional prior art and therefore allows measuring larger amounts of ingredients, without the weight of the element being of any importance.

In a further aspect, the invention also relates to a kitchen appliance having a mixing container closed by a removable closure element according to any one of the preceding embodiments. A possible kitchen appliance is in particular a blender. However, the invention is not limited to blenders, but generally to kitchen appliances which process ingredients by rapidly moving these, e.g. so-called food processors.

In an advantageous embodiment, the mixing container of the blender according to the invention comprises a lid with an opening closed by the closure element.

DETAILED DESCRIPTION

Figure 1:
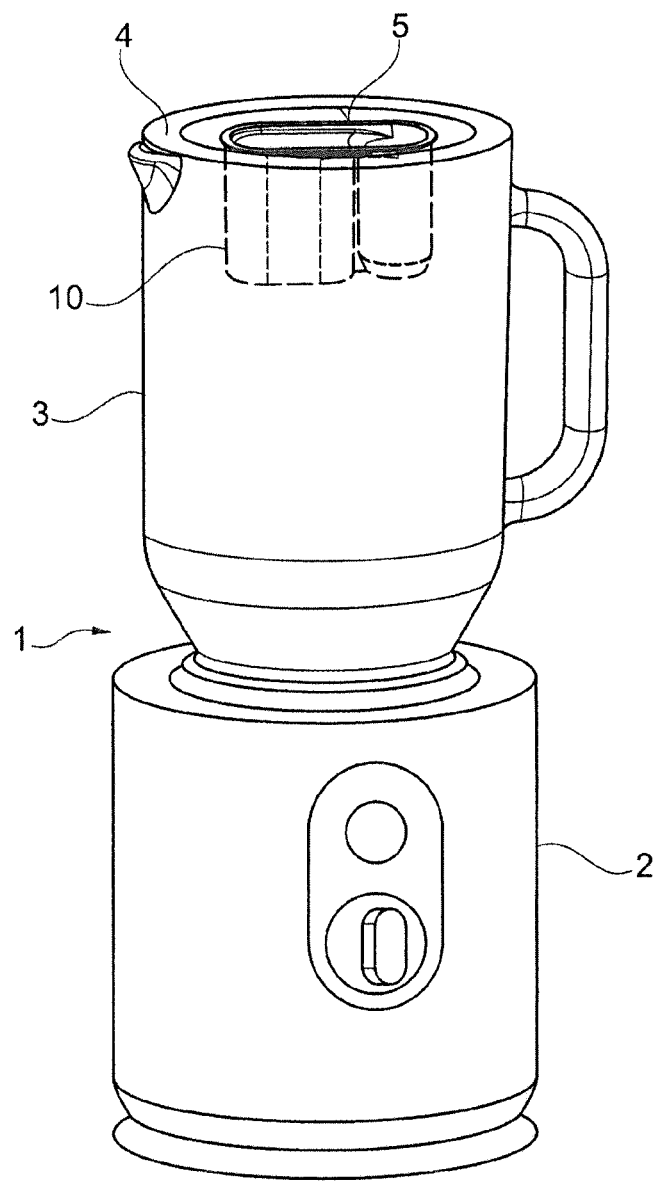
FIG. 1 is an overall view of a kitchen appliance according to the invention in the form of a blender in which the blender container is displayed transparently in order to make the closure element visible.

FIG. 1 shows as a possible example of a kitchen appliance a blender 1 which consists of a lower housing 2, in which the blender motor as well as the operating elements are located, and an upper blender container 3 as the mixing container. The blender container 3 is closed in the present embodiment by a lid 4 in which an opening 5 is provided that is closed by the closure element 10 according to the invention. It is, of course, also conceivable that the closure element in the upper area extends over the entire opening of the blender container and also acts as a lid, for which purpose the upper part of the closure element can be correspondingly configured in a flange-like manner.

Figure 2A:
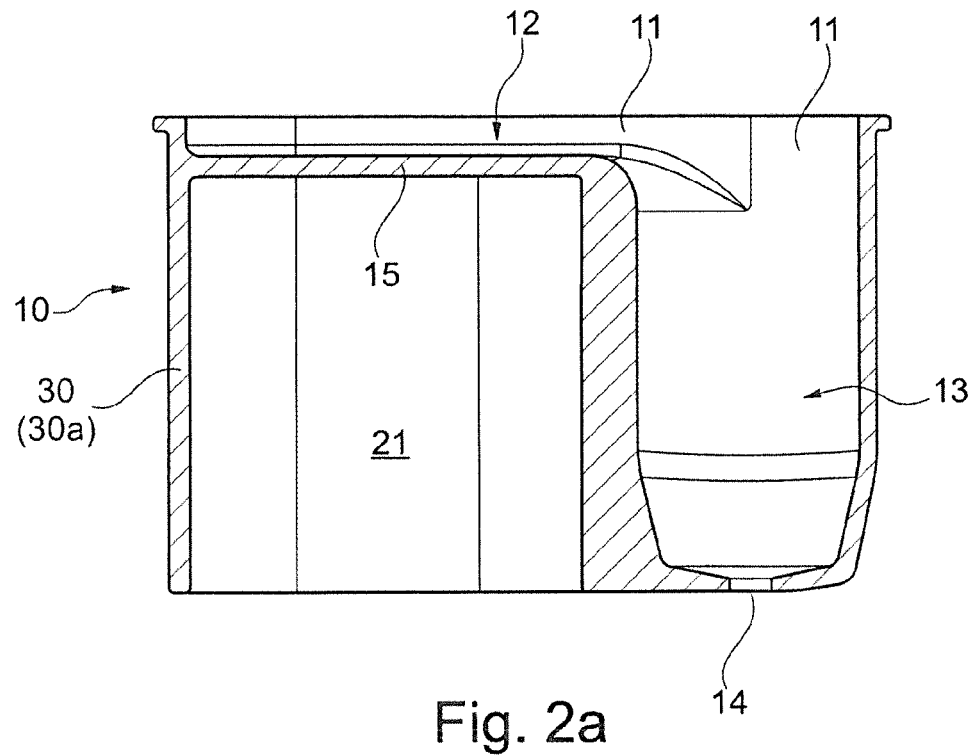
FIGS. 2a and 2b are cross-sectional views along a vertical plane through the closure element, with FIG. 2a showing the closure element in its working position, i.e. when closing the blender container, and FIG. 2b showing the closure element that is removed from the blender and turned upside down in a position in which it can be filled as a measuring cup.

In the following embodiment example, the closure element 10 has a pouring area 11 as well as a measuring area 21 which is separated therefrom and which is disposed substantially laterally to the pouring area. In the view of FIG. 2a, the pouring area 11 has an upper part 12, which extends substantially over the entire lateral expansion of the closure element, and a lower part 13 which follows the upper part 12 and extends downwards. Expediently, this lower part 13 is formed on one side of the closure element 10, in FIG. 2a to the right, while the measuring area 21 is to the left. Other arrangements are also conceivable, for example a central arrangement of the lower part of the pouring area with a measuring area arranged thereabout.

Figure 3:
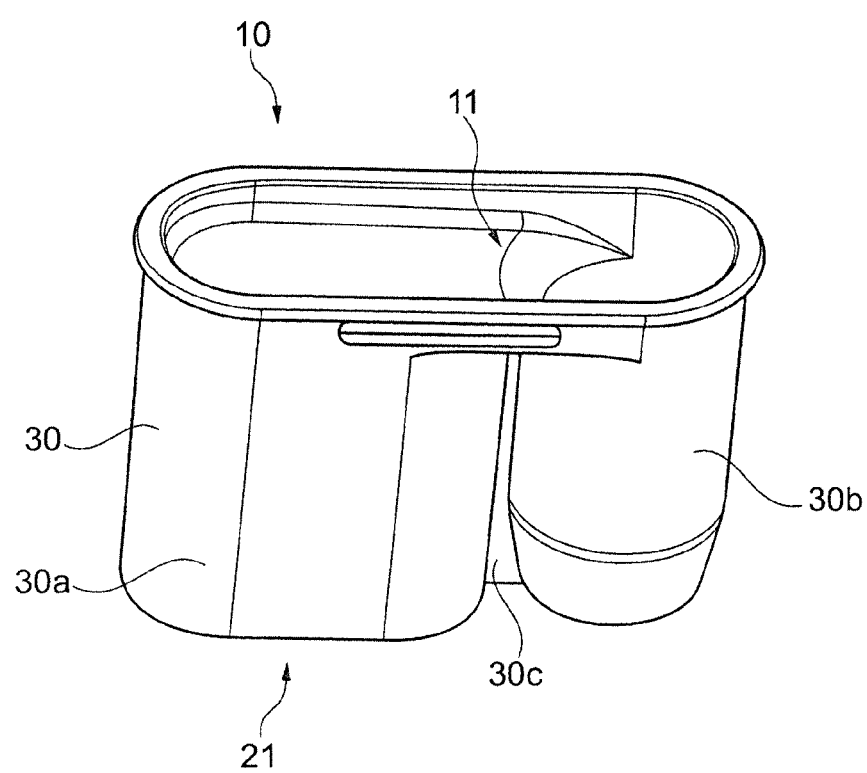
FIG. 3 is a perspective view of the closure element according to the invention.

The bottom of the upper part 12 is formed by a wall 15 which is slightly inclined from the horizontal, the inclination of which causes the ingredients poured or filled into the pouring area 11 flow to the lower part 13. At the end of the lower part 13 of the pouring area 11, there is an outlet opening 14 through which the liquid or free-flowing ingredients can flow from the pouring area 11 into the blender container 3. The lower part 13 of the pouring area 11 is formed by a substantially annular wall 30b of the closure element (FIG. 3), which forms a bottom around the outlet opening 14 such that the lower part 13 is substantially cup-shaped.

Figure 4:
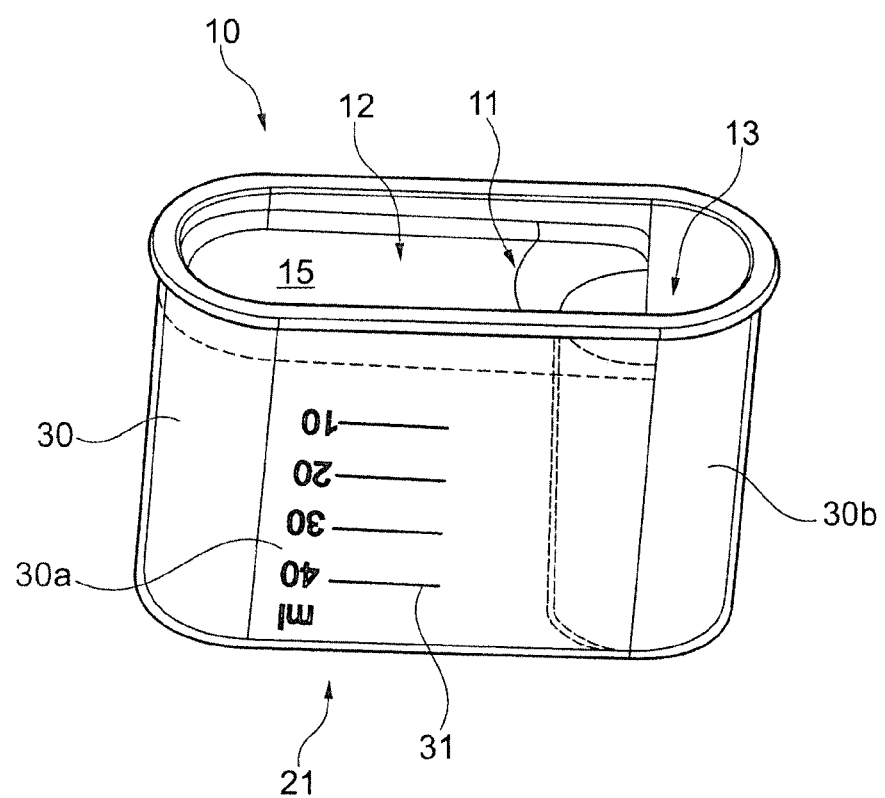
FIG. 4 shows an alternative embodiment in which the outer wall is not constricted.

The measuring area 21, which is located on the side of the lower part 13 of the pouring area 11, is limited upwardly in the view of FIG. 2a on the one hand by the wall 15 and on the other hand by a wall 30a of the closure element 10, which in the embodiment example shown has an oblong/annular cross-section and is connected to the annular wall 30b at the constriction 30c. As is shown in this example, the outer wall 30 formed by the outer parts of the walls 30a and 30b has a constriction 30c which as a gripping area facilitates holding the closure element 10. In contrast, in an alternative embodiment as shown in FIG. 4, the outer wall 30 of the closure element 10 is not constricted but has a smooth transition from the area 30a to the area 30b. The outer wall 30 and the walls 30a and 30b are expediently made of a transparent material, e.g. transparent plastic. Optionally, the outer wall 30 can also have a measuring scale 31.

Figure 2B:
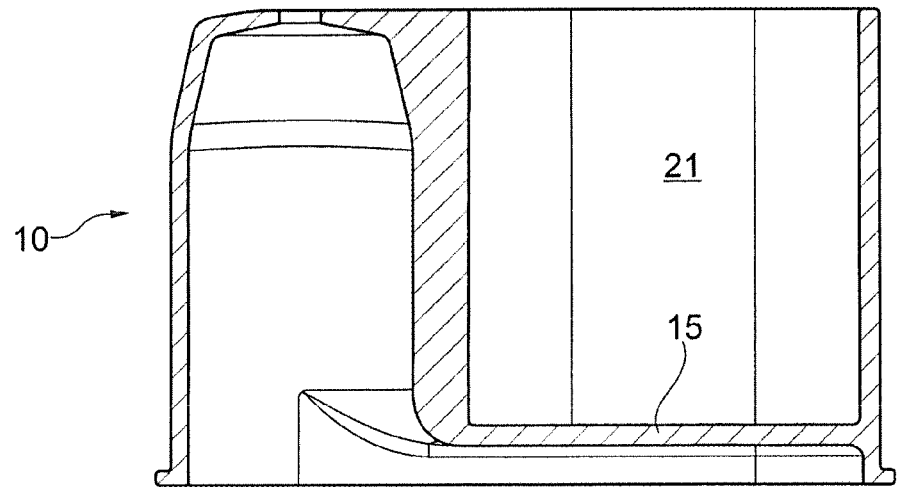

In the state shown in FIG. 2a in which the closure element closes the opening 5 of the lid 4 of the blender container 3, the measuring area 21 is downwardly open. If the closure element 10 is removed and turned upside down (FIG. 2b), the measuring area 21 can be filled and can be used to measure ingredients. These do not necessarily have to be liquid, but can also have a viscous consistency. The reason for this is that for adding the ingredient from the measuring area 21 into the blender container 3, it is sufficient to insert the closure element 10 into the lid 4 (to close the opening 5), upon which the viscous ingredient can run slowly from the measuring area 21 into the blender container, without the cup having to be held during this process.

If, however, liquid or free-flowing ingredients should be added in a controlled manner, this is done through the pouring area 11. Since its upper part 12 extends over the entire width of the closure element, it is possible to fill in liquids or free-flowing ingredients without any problems, i.e. it serves as a funnel, so to speak. The liquid or free-flowing ingredient then runs into the cup-shaped lower part 13 and passes into the blender container 3 through the defined outlet opening 14, as a result of which a steady addition is achieved at all times. It is conceivable to design the outlet opening so as to be variable in size, for example by adapters, in order to achieve different addition speeds.

It is also advantageous that the outer gripping area 30c or the outer wall 30 and the lid cannot be soiled from below by the mixed material since the corresponding surfaces face away from the action taking place in the blender. Furthermore, it is not necessary to remove the closure element 10 or to open the lid 4 of the blender container 3 when adding free-flowing ingredients or liquids. Thus, the closure element 10 with its two areas is always stowed with the blender container 3, that is the entire blender 1, such that no components can be lost.

What is claimed is:

1. A closure element for use with an underlying mixing container of a blender and configured to close the underlying mixing container directly or be inserted into an opening of a lid which in turn closes the mixing container, the closure element comprising:

a pouring area for ingredients, the pouring area comprising an upper part and a lower part, the upper part extending over substantially an entire lateral extent of the closure element, the lower part tapering away from the upper part and comprising an outlet configured to open into the underlying mixing container of the blender, the pouring area being configured to permit liquid or free-flowing ingredients to flow from the pouring area into the underlying mixing container when the closure element is inserted into the mixing container; and a measuring area bounded by a closed wall defining a single opening of the measuring area in an outer wall of the closure element, the measuring area disposed adjacent to or under the pouring area, and the single opening of the measuring area separated from the outlet of the pouring area by a portion of the outer wall, wherein a bottom wall of the upper part of the pouring area also comprises a bottom wall portion of the wall of the measuring area.

2. The closure element of claim 1, wherein:
the measuring area, when the closure element is inserted into the mixing container, is downwardly open such that when the closure element is removed and turned upside down, said measuring area can be filled and used for measuring content thereof.

3. The closure element of claim 1, wherein the lower part of the pouring area has a substantially cup- or cylinder-shaped side wall touching the closed wall of the measuring area such that a lateral outer contour of the closure element is vertically constricted there, thus forming a gripping area for the closure element.

4. A closure element for use with an underlying mixing container of a blender and configured to close the underlying mixing container directly or be inserted into an opening of a lid which in turn closes the mixing container, the closure element comprising:
a pouring area for ingredients, the pouring area comprising an upper part and a lower part, the upper part extending over substantially an entire lateral extent of the closure element, the lower part tapering away from the upper part and comprising an outlet configured to open into the underlying mixing container of the blender, the pouring area being configured to permit liquid or free-flowing ingredients to flow from the pouring area into the underlying mixing container when the closure element is inserted into the mixing container; and
a measuring area disposed adjacent to or under the pouring area and separated from the pouring area,
wherein a bottom wall of the upper part of the pouring area also comprises a bottom wall of the measuring area, and
wherein the lower part of the pouring area has a substantially cup- or cylinder-shaped side wall touching a side wall of the measuring area such that a lateral outer contour of the closure element is vertically constricted there, thus forming a gripping area for the closure element.

* * * * *